United States Patent
Gargash et al.

(10) Patent No.: US 8,996,595 B2
(45) Date of Patent: Mar. 31, 2015

(54) USER ACTIVITY RESPONSE DYNAMIC FREQUENCY SCALING PROCESSOR POWER MANAGEMENT SYSTEM AND METHOD

(71) Applicant: QUALCOMM Incorporated, San Diego, CA (US)

(72) Inventors: Norman Scott Gargash, Raleigh, NC (US); Brian J. Salsbery, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/719,564

(22) Filed: Dec. 19, 2012

(65) Prior Publication Data

US 2013/0132973 A1    May 23, 2013

Related U.S. Application Data

(63) Continuation of application No. 12/846,058, filed on Jul. 29, 2010, now Pat. No. 8,671,413.

(60) Provisional application No. 61/294,019, filed on Jan. 11, 2010.

(51) Int. Cl.
  *G06F 15/16*    (2006.01)
  *G06F 9/50*    (2006.01)
  *G06F 1/32*    (2006.01)

(52) U.S. Cl.
  CPC .............. *G06F 9/505* (2013.01); *G06F 1/3203* (2013.01); *G06F 1/324* (2013.01); *G06F 1/3296* (2013.01); *Y02B 60/1217* (2013.01); *Y02B 60/1285* (2013.01)
  USPC .......................................................... 708/104

(58) Field of Classification Search
  CPC ...... G06F 1/3203; G06F 1/324; G06F 1/3296
  See application file for complete search history.

(56) References Cited

U.S. PATENT DOCUMENTS

| | | | |
|---|---|---|---|
| 5,396,635 A | | 3/1995 | Fung |
| 5,408,663 A | * | 4/1995 | Miller ........................... 718/104 |
| 5,623,647 A | | 4/1997 | Maitra |
| 5,692,204 A | | 11/1997 | Rawson et al. |
| 6,081,901 A | | 6/2000 | Dewa et al. |

(Continued)

FOREIGN PATENT DOCUMENTS

| | | |
|---|---|---|
| EP | 0992876 A2 | 4/2000 |
| JP | H10501911 A | 2/1998 |

(Continued)

OTHER PUBLICATIONS

Poellabauer, Christian et al., Feedback-Based Dynamic Voltage and Frequency Scaling for Memory-Bound Real-Time Applications, IEEE Real-Time and Embedded Technology and Applications Symposium, 2005.*

(Continued)

*Primary Examiner* — Scott L Jarrett
(74) *Attorney, Agent, or Firm* — Nicholas A. Cole

(57) ABSTRACT

A method of executing a dynamic clock and voltage scaling (DCVS) algorithm in a central processing unit (CPU) is disclosed and may include monitoring CPU activity and determining whether a workload is designated as a special workload when the workload is added to the CPU activity.

16 Claims, 14 Drawing Sheets

(56) References Cited

U.S. PATENT DOCUMENTS

| | | | |
|---|---|---|---|
| 6,230,279 B1 | 5/2001 | Dewa et al. | |
| 6,278,421 B1 | 8/2001 | Ishida et al. | |
| 6,298,448 B1 | 10/2001 | Shaffer et al. | |
| 6,515,530 B1* | 2/2003 | Boerstler et al. | 327/291 |
| 6,684,341 B1 | 1/2004 | Malcolm et al. | |
| 6,859,882 B2* | 2/2005 | Fung | 713/300 |
| 7,017,060 B2* | 3/2006 | Therien et al. | 713/323 |
| 7,131,015 B2* | 10/2006 | Flautner et al. | 713/320 |
| 7,131,016 B2 | 10/2006 | Oh et al. | |
| 7,155,617 B2* | 12/2006 | Gary et al. | 713/300 |
| 7,174,468 B2 | 2/2007 | Gary et al. | |
| 7,178,043 B2 | 2/2007 | Nakazato | |
| 7,194,385 B2* | 3/2007 | Flautner et al. | 702/186 |
| 7,278,136 B2* | 10/2007 | Moritz et al. | 717/152 |
| 7,290,259 B2* | 10/2007 | Tanaka et al. | 718/1 |
| 7,305,521 B2* | 12/2007 | Park | 711/118 |
| 7,321,942 B2* | 1/2008 | Flautner et al. | 710/15 |
| 7,386,739 B2* | 6/2008 | Ghiasi et al. | 713/300 |
| 7,437,580 B2* | 10/2008 | Henderson et al. | 713/320 |
| 7,463,096 B2* | 12/2008 | Chi et al. | 331/2 |
| 7,500,124 B2* | 3/2009 | Seo | 713/322 |
| 7,505,795 B1* | 3/2009 | Lim et al. | 455/574 |
| 7,512,820 B2* | 3/2009 | Flautner et al. | 713/320 |
| 7,583,555 B2* | 9/2009 | Kang et al. | 365/226 |
| 7,622,979 B2* | 11/2009 | Bhatia et al. | 327/297 |
| 7,624,287 B2* | 11/2009 | Khodorkovsky et al. | 713/300 |
| 7,711,966 B2 | 5/2010 | Prabhakaran et al. | |
| 7,721,127 B2* | 5/2010 | Vishin et al. | 713/322 |
| 7,783,759 B2* | 8/2010 | Eilam et al. | 709/226 |
| 7,805,620 B2* | 9/2010 | Yang et al. | 713/300 |
| 7,821,350 B2* | 10/2010 | Dai et al. | 331/179 |
| 7,840,825 B2* | 11/2010 | Altevogt et al. | 713/320 |
| 7,913,071 B2* | 3/2011 | Mallik et al. | 713/1 |
| 7,930,573 B2* | 4/2011 | Bland et al. | 713/320 |
| 7,975,155 B2* | 7/2011 | Rozen et al. | 713/322 |
| 7,983,870 B2* | 7/2011 | Hildebrand et al. | 702/147 |
| 8,009,090 B2* | 8/2011 | Vishin et al. | 342/357.63 |
| 8,032,317 B2* | 10/2011 | Houston et al. | 702/62 |
| 8,112,644 B2* | 2/2012 | Huang et al. | 713/320 |
| 8,117,469 B2* | 2/2012 | Schmitz et al. | 713/300 |
| 8,127,160 B2* | 2/2012 | Bieswanger et al. | 713/321 |
| 8,145,918 B2* | 3/2012 | Borghetti et al. | 713/300 |
| 8,181,051 B2* | 5/2012 | Barth | 713/323 |
| 8,234,511 B2* | 7/2012 | Lopata | 713/320 |
| 8,239,694 B2* | 8/2012 | Saha et al. | 713/300 |
| 8,245,057 B2* | 8/2012 | Lyu | 713/300 |
| 8,255,915 B1* | 8/2012 | Blanding et al. | 718/104 |
| 8,261,112 B2* | 9/2012 | Carter et al. | 713/320 |
| 8,510,740 B2* | 8/2013 | Salsbery et al. | 718/102 |
| 8,671,413 B2* | 3/2014 | Garash et al. | 718/105 |
| 2002/0087611 A1* | 7/2002 | Tanaka et al. | 709/1 |
| 2004/0123297 A1* | 6/2004 | Flautner et al. | 718/102 |
| 2004/0139302 A1* | 7/2004 | Flautner et al. | 712/220 |
| 2005/0060597 A1* | 3/2005 | Albonesi et al. | 713/600 |
| 2005/0097228 A1* | 5/2005 | Flautner et al. | 710/1 |
| 2005/0193115 A1* | 9/2005 | Chellis et al. | 709/226 |
| 2005/0198102 A1* | 9/2005 | Hahn et al. | 709/200 |
| 2005/0218871 A1* | 10/2005 | Kang et al. | 323/265 |
| 2005/0268133 A1* | 12/2005 | Beard | 713/322 |
| 2005/0278561 A1* | 12/2005 | Seo | 713/322 |
| 2006/0100826 A1* | 5/2006 | Peterson | 702/189 |
| 2007/0011476 A1* | 1/2007 | Flautner et al. | 713/300 |
| 2007/0016817 A1 | 1/2007 | Albonesi et al. | |
| 2007/0150763 A1 | 6/2007 | Yang et al. | |
| 2007/0226741 A1* | 9/2007 | Seshadri | 718/103 |
| 2007/0234091 A1 | 10/2007 | Vishin et al. | |
| 2008/0034366 A1 | 2/2008 | Tanaka et al. | |
| 2008/0059813 A1* | 3/2008 | Khodorkovsky et al. | 713/300 |
| 2008/0077290 A1 | 3/2008 | Weinmann et al. | |
| 2008/0077348 A1 | 3/2008 | Hildebrand et al. | |
| 2008/0148273 A1 | 6/2008 | Huang et al. | |
| 2008/0162965 A1 | 7/2008 | Marinas et al. | |
| 2008/0301474 A1 | 12/2008 | Bussa et al. | |
| 2008/0301690 A1 | 12/2008 | Do et al. | |
| 2008/0313482 A1 | 12/2008 | Karlapalem et al. | |
| 2009/0043493 A1 | 2/2009 | Sakai | |
| 2009/0049314 A1* | 2/2009 | Taha et al. | 713/300 |
| 2009/0077290 A1 | 3/2009 | Dolwin | |
| 2009/0100276 A1* | 4/2009 | Rozen et al. | 713/300 |
| 2009/0193419 A1 | 7/2009 | McAlinden et al. | |
| 2009/0204830 A1 | 8/2009 | Frid et al. | |
| 2009/0254909 A1* | 10/2009 | Hanson et al. | 718/102 |
| 2009/0258641 A1 | 10/2009 | Yaqub et al. | |
| 2009/0276639 A1 | 11/2009 | Saha et al. | |
| 2010/0017042 A1 | 1/2010 | Lopata | |
| 2010/0146316 A1 | 6/2010 | Carter et al. | |
| 2010/0174928 A1* | 7/2010 | Borghetti et al. | 713/320 |
| 2010/0285769 A1 | 11/2010 | Conroy et al. | |
| 2010/0289553 A1 | 11/2010 | Wang | |
| 2011/0004774 A1 | 1/2011 | Hansquine et al. | |
| 2011/0163801 A1 | 7/2011 | Chua-Eoan | |
| 2011/0173463 A1 | 7/2011 | Gargash et al. | |
| 2011/0173617 A1 | 7/2011 | Gargash et al. | |
| 2011/0173628 A1 | 7/2011 | Gargash et al. | |

FOREIGN PATENT DOCUMENTS

| | | |
|---|---|---|
| JP | H10333773 A | 12/1998 |
| JP | 2000112544 A | 4/2000 |
| JP | 2001273057 A | 10/2001 |
| WO | 0038038 A1 | 6/2000 |
| WO | 2009138953 A1 | 11/2009 |

OTHER PUBLICATIONS

Gurun, Selim et al., AutoDVS: An Automatic, General-Purpose, Dynamic Clock Scheduling System for Hand-Held Devices UCSB Technical Report, Mar. 1, 2005.*

Lin, Bin, et al., User and Process-Driven Dynamic Voltage and Frequency Scaling iPass09, 2009.*

Weissel, Andreas et al., Process Cruise Control—Event-Driven Clock Scaling for Dynamic Power Management Cases 2002, Oct. 8-11, 2002.*

Yang, Lei et al., HAPPE: Human and Application Driven Frequency Scaling for Processing Power Efficiency IEEE Transactions on Mobile Computing (TMC), Date Unkown.*

Lorch, Jacob R. et al., Using User Interface Event Information in Dynamic Voltage Scaling Algorithms Proceedings of the Eleventh IEEE/ACM International Symposium on Modeling, Analysis and Simulation of Computer and Telecommunication Systems, Oct. 2003.*

Lorch, Jacob R. et al., Improving Dynamic Voltage Scaling Algorityms with PACE ACM Sigmetrics, 2001.*

Jung, Hwisung et al., Continuous Frequency Adjustment Technique Based on Dynamic Workload Prediction 21st International Conference on VLSI Design, VLSID 2008, Jan. 2008.*

Malik, Arindam et al., PICSEL: Measuring User-Perceived Performance to Control Dynamic Frequency Scaling ASPLOS, 2008.*

Malik, Arindam et al., User-Driven Frequency Scaling IEEE Computer Architecture Letters, vol. 5, 2006.*

Dhiman, Gaurav et al., Dynamic Power Management Using Machine Learning ICCAD'06, ACM, Nov. 5-9, 2006.*

Flautner, Krisztian et al, Automatic Performance Setting for Dynamic Voltage Scaling May 30, 2001.*

Varma, Ankush et al., A Control-Theoretic Approach to Dynamic Voltage Scheduling Proceedings International Conference on Compilers, Architectures and Synthesis for Embedded Systems, CASES03, Oct. 30-Nov. 1, 2003.*

Surun, Selim et al., AutoDVS: An Automatic, General-Purpose, Dynamic Clock Scheduling System for Hand-Held Devices ACM, EMSOFT'05, Sep. 19-22, 2005.*

Flautner, Krisztian et al., "Automatic Performance Setting for Dynamic Voltage Scaling," 7th Annual Int'l Conference on Mobile Computing and Networking, May 30, 2001.

Pillai, Padmanabhan et al., "Rea-Time Dynamic Voltage Scaling for Low-Power Embedded Operating Systems," ACM, 2001.

Weissel, Andreas et al., "Process Cruise Control: Event-Driven Clock Scaling for Dynamic Power Management," Cases 2002, Oct. 8-11, 2002.

(56) References Cited

OTHER PUBLICATIONS

Flautner, Krisztian et al., "Vertigo: Automatic Performance Setting for Linux," Proceedings of the 5th Symposium on Operating Systems Design and Implementation, Dec. 2002.

Choi, Kihwan, "Frame-Based Dynamic Voltage and Frequency Scaling for an MPEG Player," Proc. of INt'l Conference on Computer Aided Design (ICCAD), Nov. 2002.

Gurun, Selim et al., AutoDVS: An Automatic, General-Purpose, Dynamic Clock Scheduling System for Hand-Held Devices, UCSB Tech. Report 2005-04, Mar. 1, 2005.

Zhu, Yifan, "Dynamic Voltage Scaling with Feedback Scheduling for Real-Time Embedded Systems," North Carolina State Univ., 2005.

Herbert, Sebastian, "Analysis of Dynamic Voltage/Frequency Scaling in Chip-Multiprocessors," ISLPED '07, Aug. 27-29, 2007.

Chen, Jian-Jia et al., "Energy-Efficient Scheduling for Real-Time Systems on Dynamic Voltage Scaling (DVS) Platforms," RTCSA '07 Proceedings of the 13th IEEE Int'l Conference on Embedded and Real-Time Computing Systems and Applications, 2007.

Dhiman, Gaurav, "Dynamic Voltage Frequency Scaling for Multi-tasking Systems Using Online Learning," ISLPED '07, ACM, Aug. 27-29, 2007.

Kim, Wonyoung et al., "System Level Analysis of Fast, Per-Core DVFS Using On-Chip Switching Regulators," IEEE Int'l Symposium on High-Performance Computer Architecture (HPCA), Feb. 2008.

Herbert, Sebastian et al., "Variation-Aware Dynamic Voltage/Frequency Scaling," Proc. of the 15th Int'l Symposium on High-Performance Computer Architecture (HPCA), Feb. 2009.

Lin, Bin et al., "User- and Process-Driven Dynamic Voltage and Frequency Scaling," IPASS09, May 2009.

Gossens, Kees et al., "Composable Dynamic Voltage and Frequency Scaling and Power Management for Dataflow Applications," DSD, 2010.

International Search Report and Written Opinion—PCT/US2011/020696—ISA/EPO—Apr. 1, 2011.

* cited by examiner

USER ACTIVITY RESPONSE DYNAMIC FREQUENCY SCALING PROCESSOR POWER MANAGEMENT SYSTEM AND METHOD

RELATED APPLICATIONS

The present application is a continuation of U.S. patent application Ser. No. 12/846,058, entitled SYSTEM AND METHOD OF DYNAMIC CLOCK AND VOLTAGE SCALING FOR WORKLOAD BASED POWER MANAGEMENT OF A WIRELESS MOBILE DEVICE, filed on Jul. 29, 2010, which claims priority to U.S. Provisional Patent Application Ser. No. 61/294,019, entitled SYSTEM AND METHOD OF DYNAMICALLY CONTROLLING A PROCESSOR, filed on Jan. 11, 2010, the contents of both of which are herein fully incorporated by reference.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of executing a dynamic clock and voltage scaling algorithm in a central processing unit.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
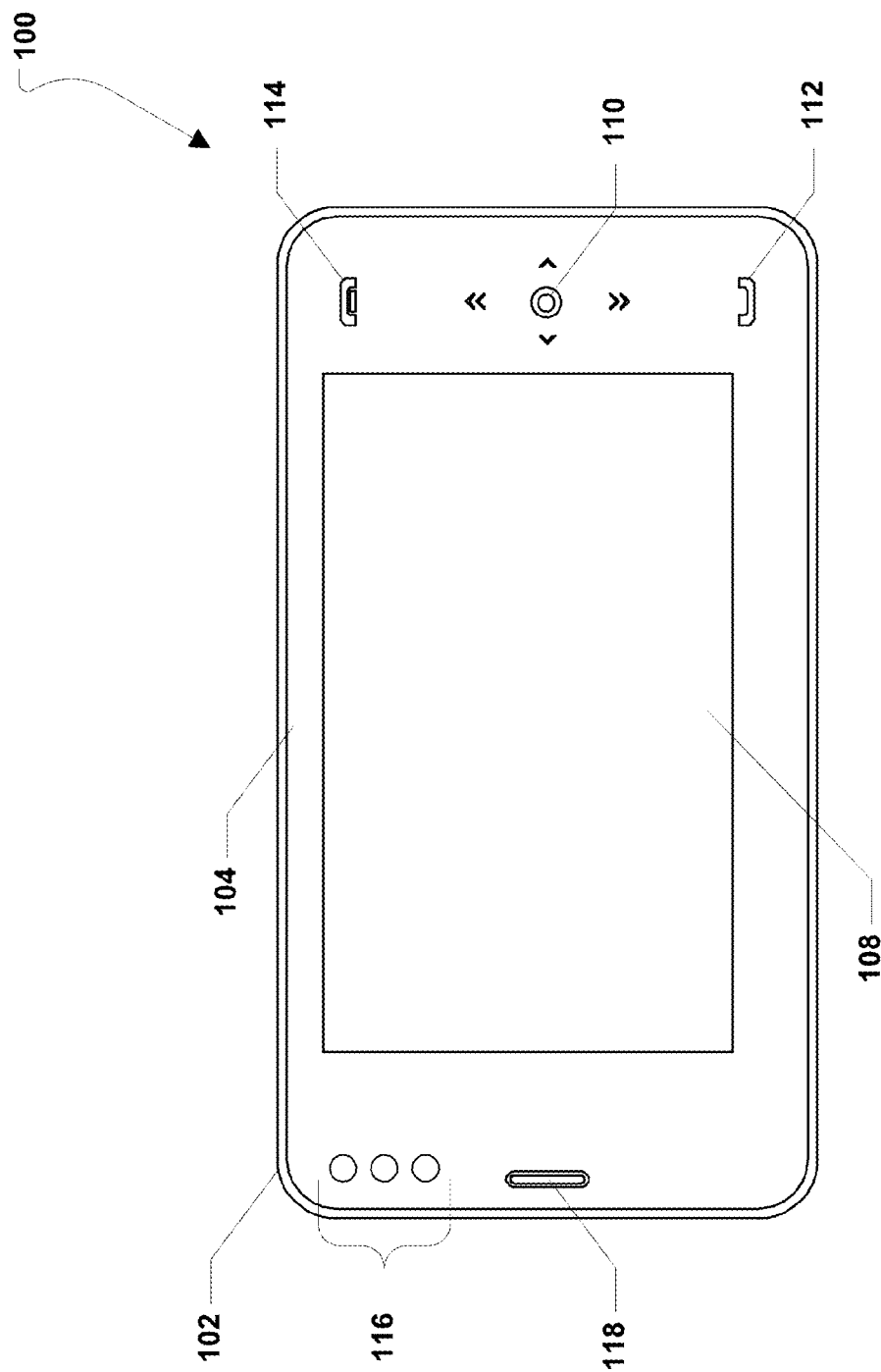
FIG. 1 is a front plan view of a first aspect of a portable computing device (PCD) in a closed position.
Figure 2:
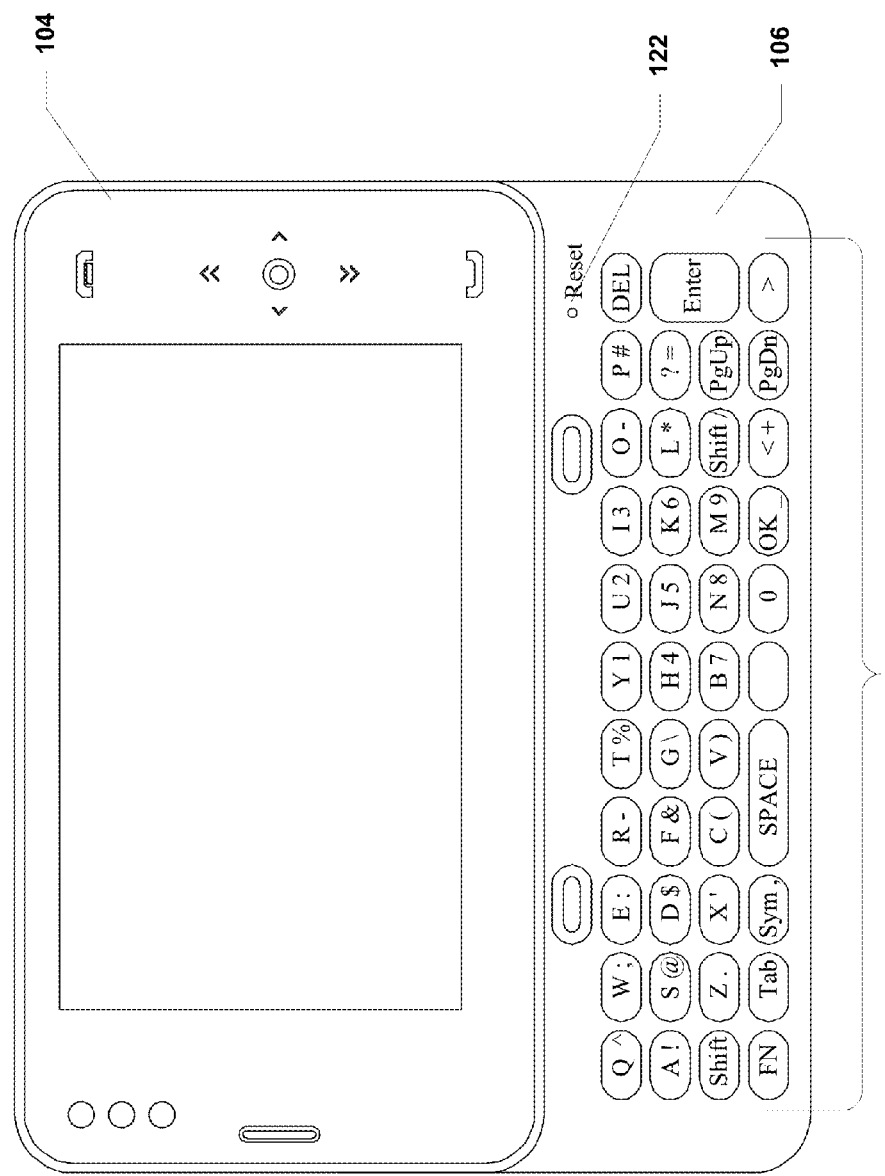
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
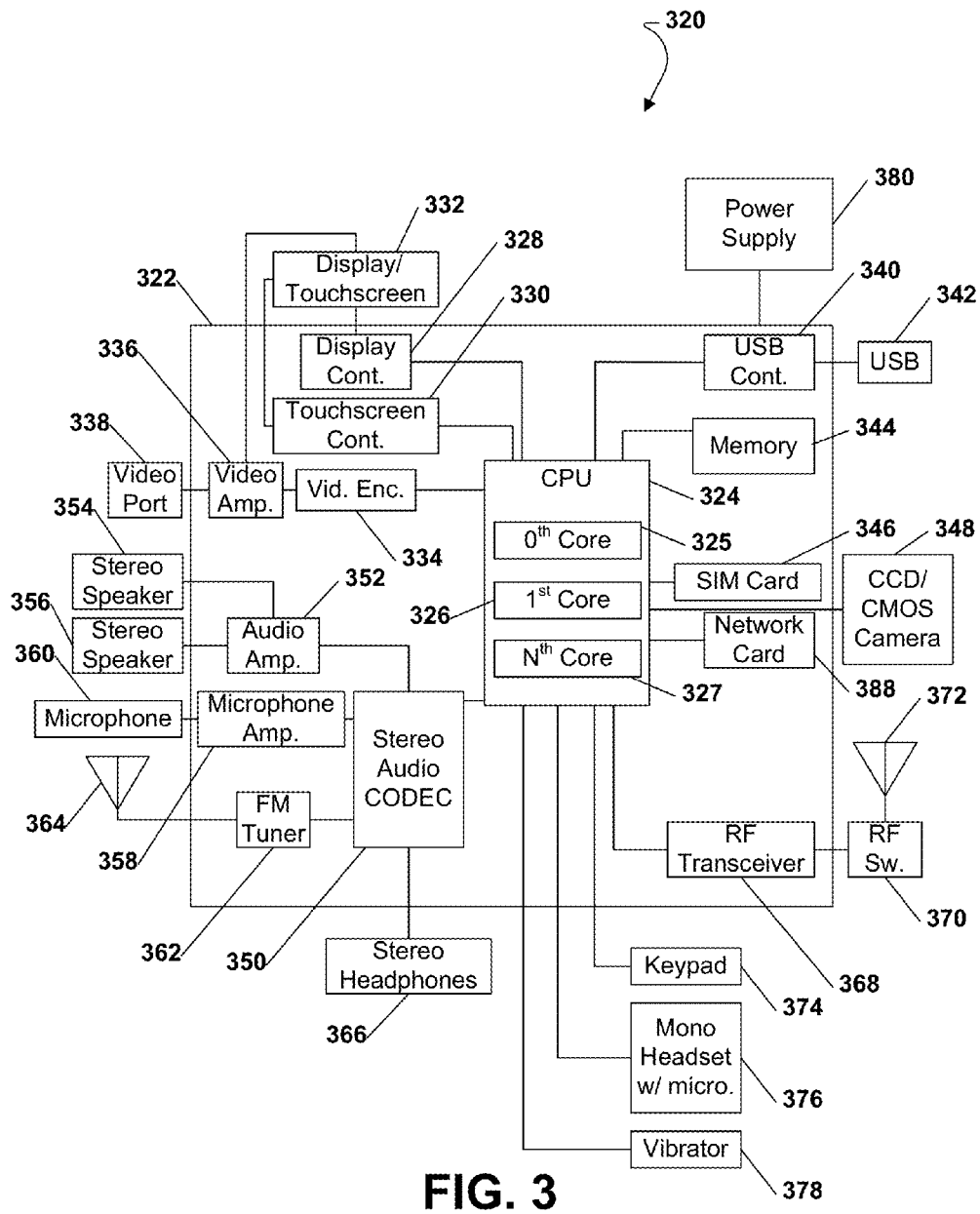
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to execute a dynamic clock and voltage switching algorithm within a central processing unit based on a type of workload.

Figure 4:
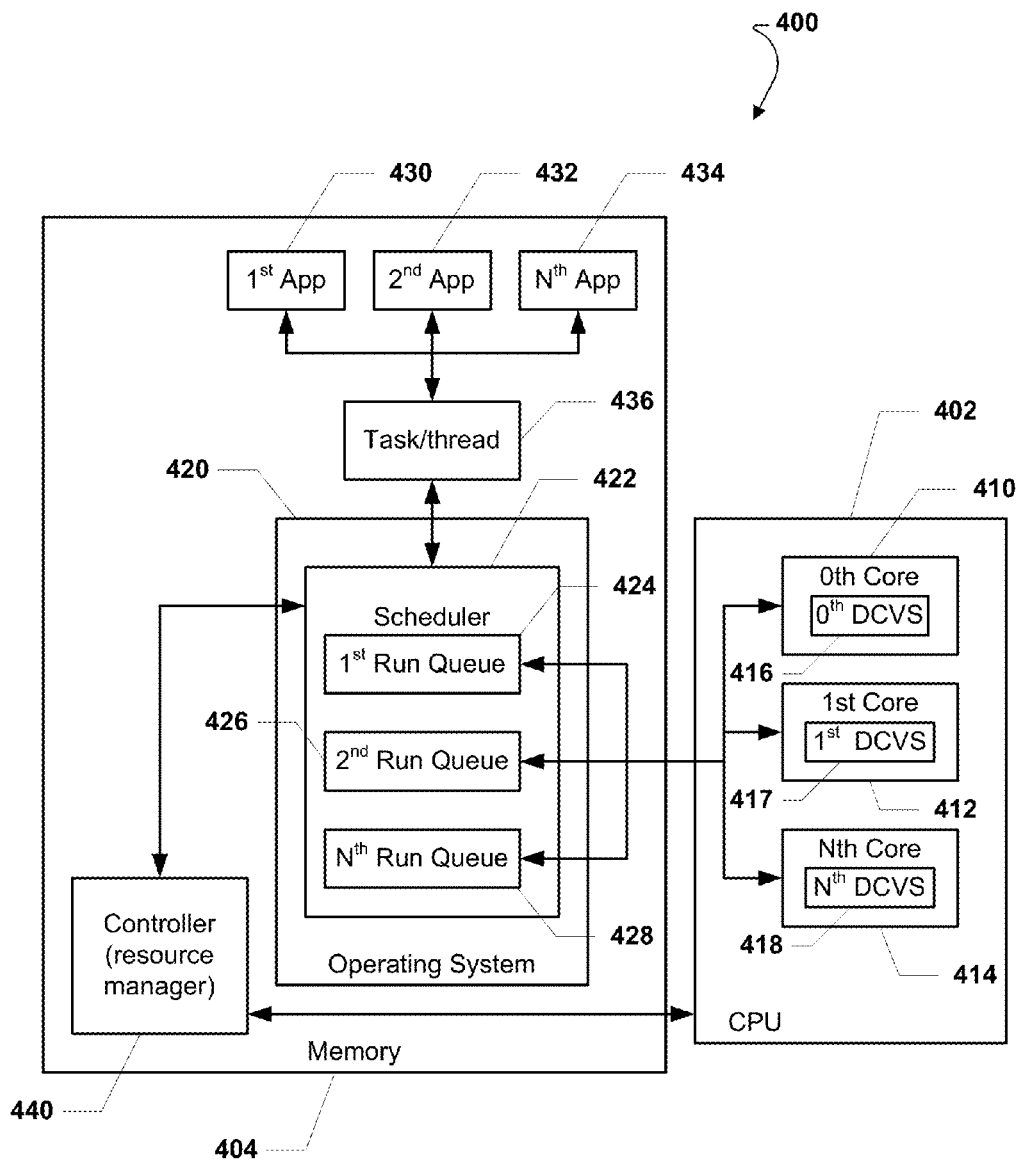
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a controller 440 stored thereon. The controller 440 may be connected to the operating system 420 and the multicore CPU 402. Specifically, the parallelism monitor 440 may be connected to the scheduler 422 within the operating system 420. As described herein, the controller 440 may monitor the workloads on the cores 410, 412, 414 and the controller 440 may execute, or cause to be executed, the DCVS algorithms 416, 417, 418 their respective core 410, 412, 414.

In a particular aspect, the controller 440 may be a software program. However, in an alternative aspect, the controller 440 may be a hardware controller that is external to the memory 404. In either case, the controller 440, the memory 404, the cores 410, 412, 414, or any combination thereof may serve as a means for executing one or more of the method steps described herein in order to execute a dynamic clock and voltage switching algorithm within a central processing unit based on a type of workload.

Figure 5:
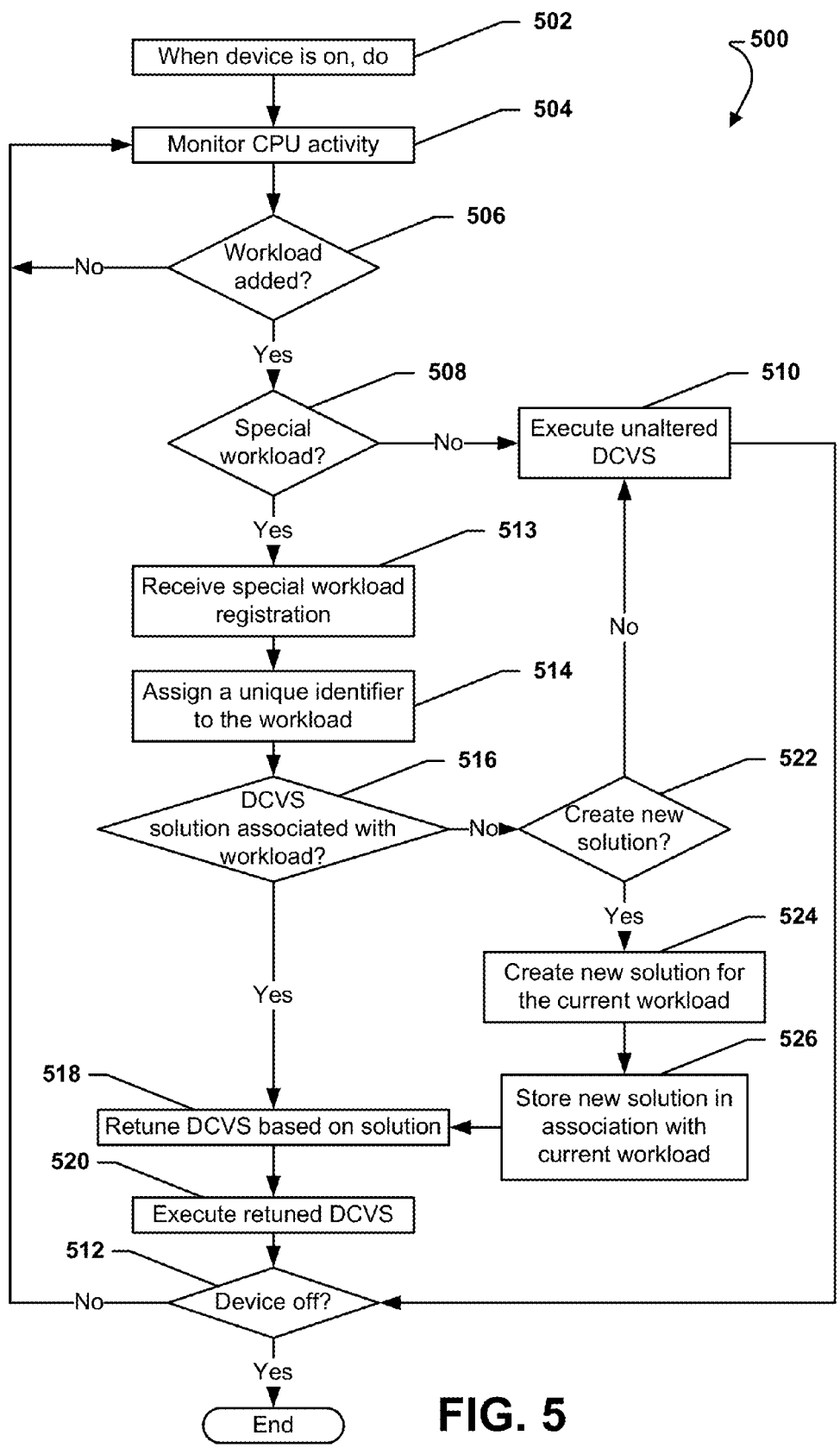
FIG. 5 is a flowchart illustrating a first aspect of a method of executing a dynamic clock and voltage switching algorithm within a central processing unit.

Referring to FIG. 5, a first aspect of a method of executing a dynamic clock and voltage scaling (DCVS) algorithm is shown and is generally designated 500. The method 500 begins at block 502 with a do loop in which when a device is powered on, the following steps may be performed. At block 504, a controller may monitor CPU activity. This activity may be the activity of a single core CPU, a multi-core CPU, multiple single core CPUs, multiple multi-core CPUs, or a combination thereof. Further, the controller may be a software controller, a hardware controller, or a combination thereof.

At decision 506, the controller may determine if a workload is added. The workload may be a video application, an audio application, an email application, a wireless network application, a cellular network application, a short message service (SMS) application, a communication application, a security application, a calendar application, an instant messaging application, a still camera application, a global positioning system (GPS) application, a browser application, a memo pad application, a clock application, a game application, a calculator application, a banking application, a password keeper application, a help application, an ecommerce application, a software delivery application, a search application, an options application, a setup application, a telephone application, a connection management application, a security application, any other application, or a combination thereof.

In a particular aspect, if a workload is not added at decision 506, the method 500 may return to block 504 and the method 500 may continue as described herein. Otherwise, at decision 506, if a workload is added, the method 500 may continue to decision 508, and the controller may determine whether the workload is a special workload, i.e., a type of workload which may warrant different treatment by a DCVS algorithm. The special workload may be an impulse workload, a registered workload, an isochronous workload, a pulsed workload, a best effort workload, a scheduled workload, or a combination thereof. The controller may determine whether the workload is a special workload based on an input received from the workload.

At decision 508, if the workload is not special, the method 500 may proceed to block 510 and the controller may execute an unaltered DCVS algorithm. Thereafter, the method 500 may move to decision 512 and the controller may determine whether the device is powered off. If the device is not powered off, i.e., the device remains on, the method 500 may return to block 504 and the method 500 may continue as described herein. Otherwise, if the device is powered off, the method 500 may end.

Returning to decision 508, if the workload is a special workload, the method 500 may continue to block 513 and the controller may receive a registration for the special workload. At block 514, the controller may assign a unique identifier to the special workload. Then, at decision 516, the controller may determine whether a DCVS solution is associated with workload, i.e., whether a modification, or an alteration, to a DCVS algorithm is associated with the workload. The workload may indicate a type associated the workload and a solution associated with the workload.

If a DCVS solution is associated with the special workload, the method 500 may proceed to block 518 and the controller may automatically retune the DCVS algorithm based on solution associated with the special workload. Next, at block 520, the controller may execute the retuned DCVS algorithm. The method 500 may then move to decision 512 and the method 500 may continue as described herein.

Returning to decision 516, if there is not a DCVS solution associated with the special workload, the method 500 may proceed to decision 522 and the controller may determine whether to create a new solution. For example, the controller may query the workload to determine if the workload has a predetermined solution. If so, the controller may implement that solution. Alternatively, the controller may query the workload for specific workload requirements and the controller may create a new solution for the workload based on the requirements of the workload. The workload requirements, for example, may be expressed in millions of instructions per second (MIPS). In another aspect, the workload requirement may be expressed as a frequency, e.g., a kilohertz value (kHz), a megahertz (MHz) value, a gigahertz (GHz) value, etc. In yet another aspect, the workload requirement may be expressed as a data transfer rate, e.g., kilobits per second (KB/S), megabits per second (MB/S), gigabits per second (GB/S), or a combination thereof. The workload requirements may further include a responsivity value. The responsivity may be a rate of change of a system setting. For example, the responsivity may be a rate of change of a CPU frequency, a rate of change of a voltage, or a combination thereof. Further, the responsivity may be a maximum delay as expressed in milliseconds, a CPU slew rate bound as expressed frequency per milliseconds (MHz/ms), or a combination thereof. Also, the workload requirements may include any combination of the preceding workload requirements.

At decision 522, if the controller does not decide to create a new solution, the method 500 may proceed to block 510 and the method 500 may continue as described herein. Otherwise, if the controller does decide to create a new solution, the method 500 may move to block 524 and the controller may create a new solution for the current workload, e.g., based on one or more workload requirements received from the current workload. Next, at block 526, the controller may store the new solution in a table or database associated. The solution may be stored in conjunction with a unique identifier associated with the workload. The method 500 may then move to block 518 and the method 500 may continue as described herein.

Figure 6:
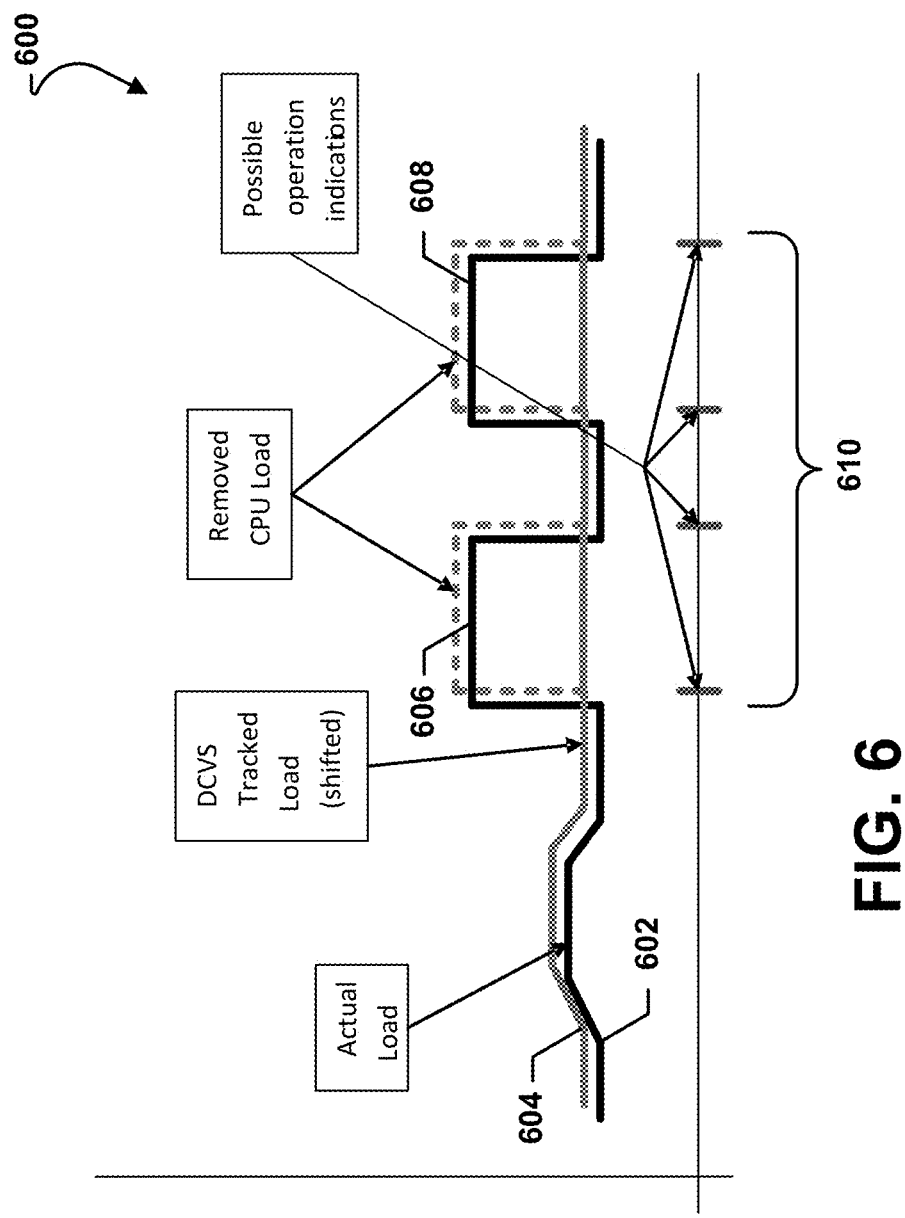
FIG. 6 is a first graph illustrating a workload and a dynamic clock and voltage scaling tracked load for a central processing unit plotted versus time.

FIG. 6 illustrates a first graph, generally designated 600, of a workload and a dynamic clock and voltage scaling tracked load for a central processing unit plotted versus time. As shown, the graph 600 includes a workload indicator 602 and a DCVS tracked load indicator 604. As shown, the workload indicator 602 may include a first busy cycle 606 and a second busy cycle 608. If the types of workloads included in the first busy cycle 606 and the second busy cycle 608 are determined to be special and the special workloads have a DCVS solution associated with them that exempts them from the execution of the DCVS algorithm, the DCVS tracked load indicator 604 may remain relatively flat as shown through the first busy cycle 606 and the second busy cycle 608. If the workloads are not special or do not have solutions associated therewith, the DCVS tracked load indicator 604 may track the first busy cycle 606 and the second busy cycle 608 as indicated by the dashed lines.

As shown in FIG. 6, a plurality of operation indicators 610 may be used to trigger the special treatment of special workloads. The operation indicators 610 may include a start solution, stop solution, or a combination thereof.

Figure 7:
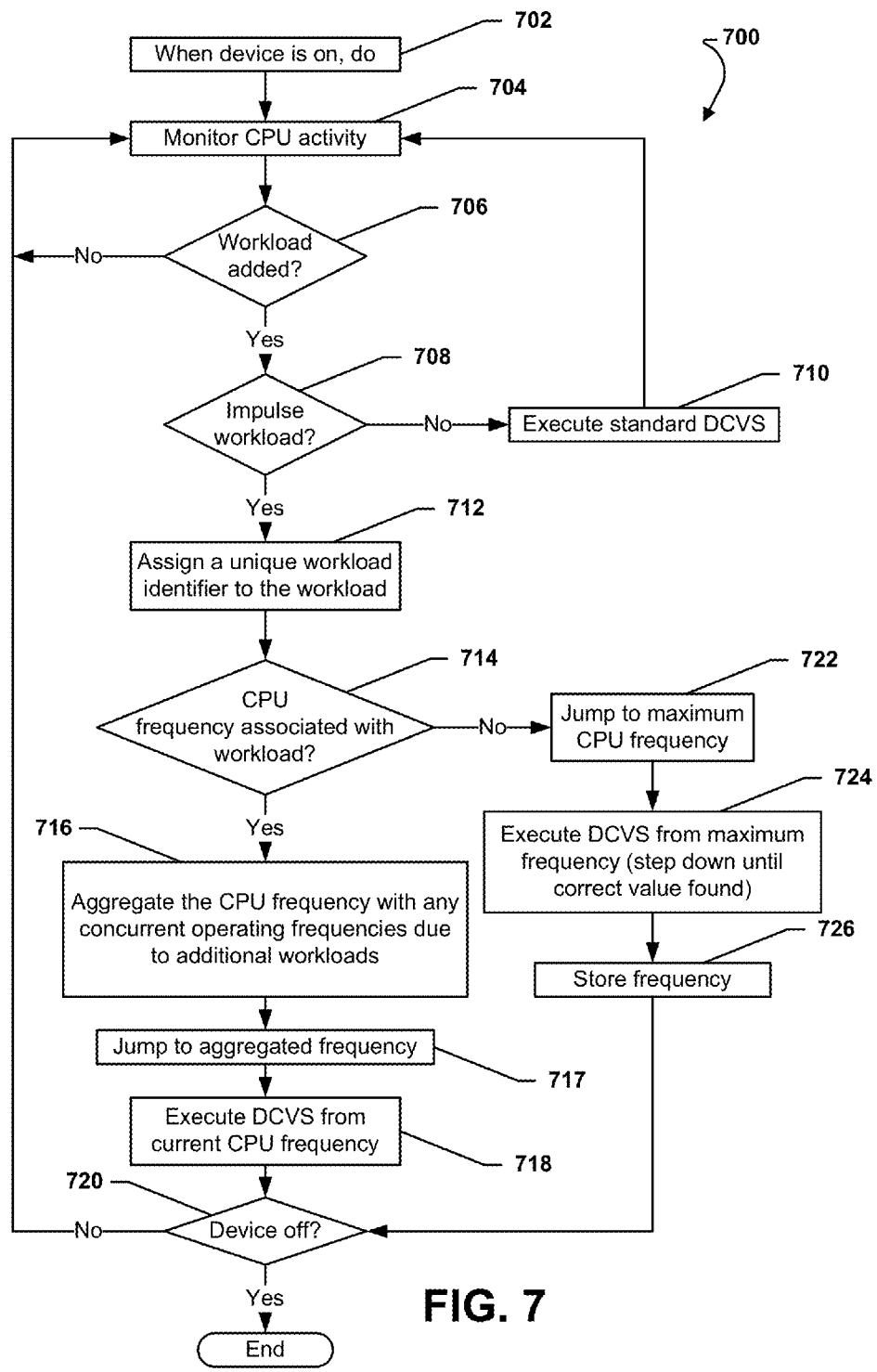
FIG. 7 is a flowchart illustrating a second aspect of a method of executing a dynamic clock and voltage switching algorithm within a central processing unit.

Referring to FIG. 7, a second aspect of a method of executing a dynamic clock and voltage scaling (DCVS) algorithm is shown and is generally designated 700. The method 700 begins at block 702 with a do loop in which when a device is powered on, the following steps may be performed. At block 704, a controller may monitor CPU activity. This activity may be the activity of a single core CPU, a multi-core CPU, multiple single core CPUs, multiple multi-core CPUs, or a combination thereof. Further, the controller may be a software controller, a hardware controller, or a combination thereof.

At decision 706, the controller may determine if a workload is added. The workload may be a video application, an audio application, an email application, a wireless network application, a cellular network application, a short message service (SMS) application, a communication application, a security application, a calendar application, an instant messaging application, a still camera application, a global positioning system (GPS) application, a browser application, a memo pad application, a clock application, a game application, a calculator application, a banking application, a password keeper application, a help application, an ecommerce application, a software delivery application, a search application, an options application, a setup application, a telephone application, a connection management application, a security application, any other application, or a combination thereof.

In a particular aspect, if a workload is not added at decision 706, the method 700 may return to block 704 and the method 700 may continue as described herein. Otherwise, at decision 706, if a workload is added, the method 700 may continue to decision 708, and the controller may determine whether the workload is an impulse workload. An impulse workload may be a key press event, a touchscreen event, another impulse type event, or a combination thereof. Further, an impulse workload may have a well known starting point, but no well known end, and no well known load. The response of the DCVS algorithm may depend on the specifics of each impulse workload. For example, the DCVS may respond to a keypad event by jumping to full performance, while a touchscreen event may not require a full performance response.

At decision 708, if the workload is not an impulse workload, the method 700 may move to block 710 and the controller may execute a standard, i.e., unaltered, DCVS algorithm. Thereafter, the method 700 may return to block 704 and the method 700 may continue as described herein.

Returning to decision 708, if the added workload is an impulse workload, the method 700 may proceed to block 712 and the controller may assign a unique identifier associated with the added workload. Next, at decision 714, the controller may determine whether there is a CPU frequency associated with the workload. The CPU frequency may be determined from historical values associated with the workload. The historical values may be stored in a controller associated with the workload.

If there is a CPU frequency associated with the workload, the method 700 may continue to block 716 and the controller may aggregate the new workload with any concurrent workloads, e.g., registered and un-registered. For example, if there were 100 MIPS of load associated with the impulse and 50 MIPS of other load, the controller would jump to 150 MIPS. Then, at block 717, the controller may jump to the aggregated CPU frequency. Thereafter, at block 718, the controller may execute the DCVS algorithm from current CPU frequency. Moving to decision 720, the controller may determine whether the device is powered off. If the device is not powered off, the method 700 may return to block 704 and the method 700 may continue as described herein. Otherwise, at decision 720, if the device is powered off, the method 700 may end.

Returning to decision 714, if the controller does not find a CPU frequency in the database that is associated with the added workload, the method 700 may move to block 722. At block 722, the controller may jump to a maximum CPU frequency. Next, at block 724, the controller may execute the DCVS algorithm from the maximum frequency and the controller, using the DCVS algorithm, may step down the CPU frequency until a correct, or appropriate, frequency value for the workload is found. At block 726, the controller may store the frequency. The method 700 may then move to decision 720 and the method 700 may continue as described herein.

Figure 8:
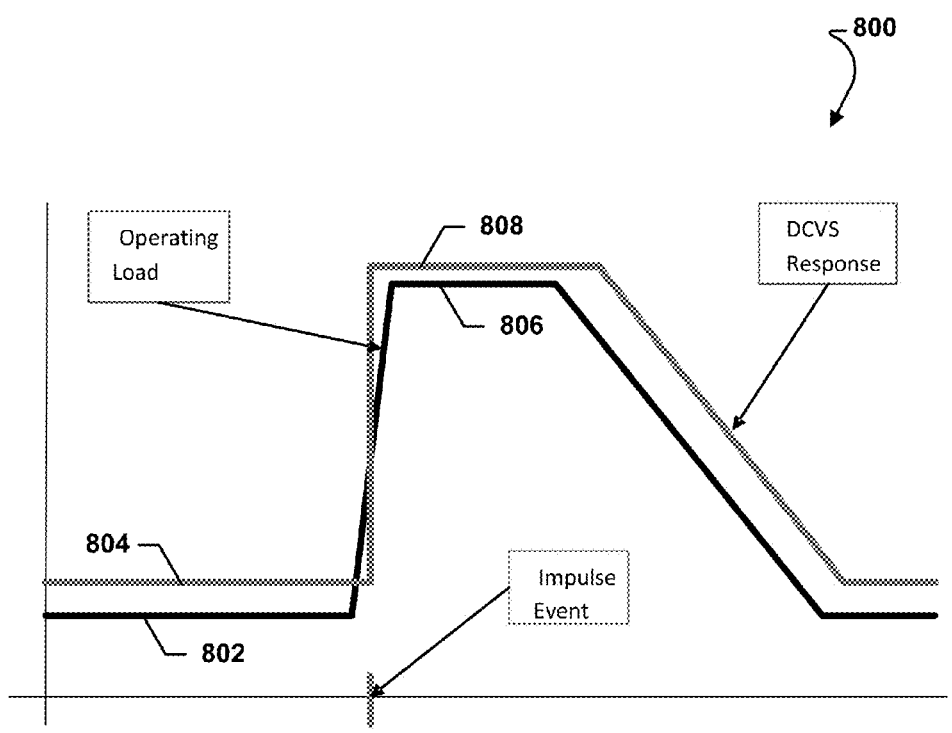
FIG. 8 is a second graph illustrating a workload and a dynamic clock and voltage scaling tracked load for a central processing unit plotted versus time.

FIG. 8 illustrates a second graph, generally designated 800, of a workload and a DCVS response for a central processing unit plotted versus time. As shown, the graph 800 may include a workload indicator 802 and a DCVS response indicator 804. As shown, the workload indicator 802 may include a busy cycle 806 that begins with an impulse event. The DCVS response indicator 804 may include a DCVS response 808 that closely tracks the busy cycle. The DCVS response 808 may jump to a known frequency associated with the impulse event, or a maximum CPU frequency. Thereafter, the DCVS response 808 may decrease as shown in FIG. 8 as the DCVS algorithm is executed.

Figure 9:
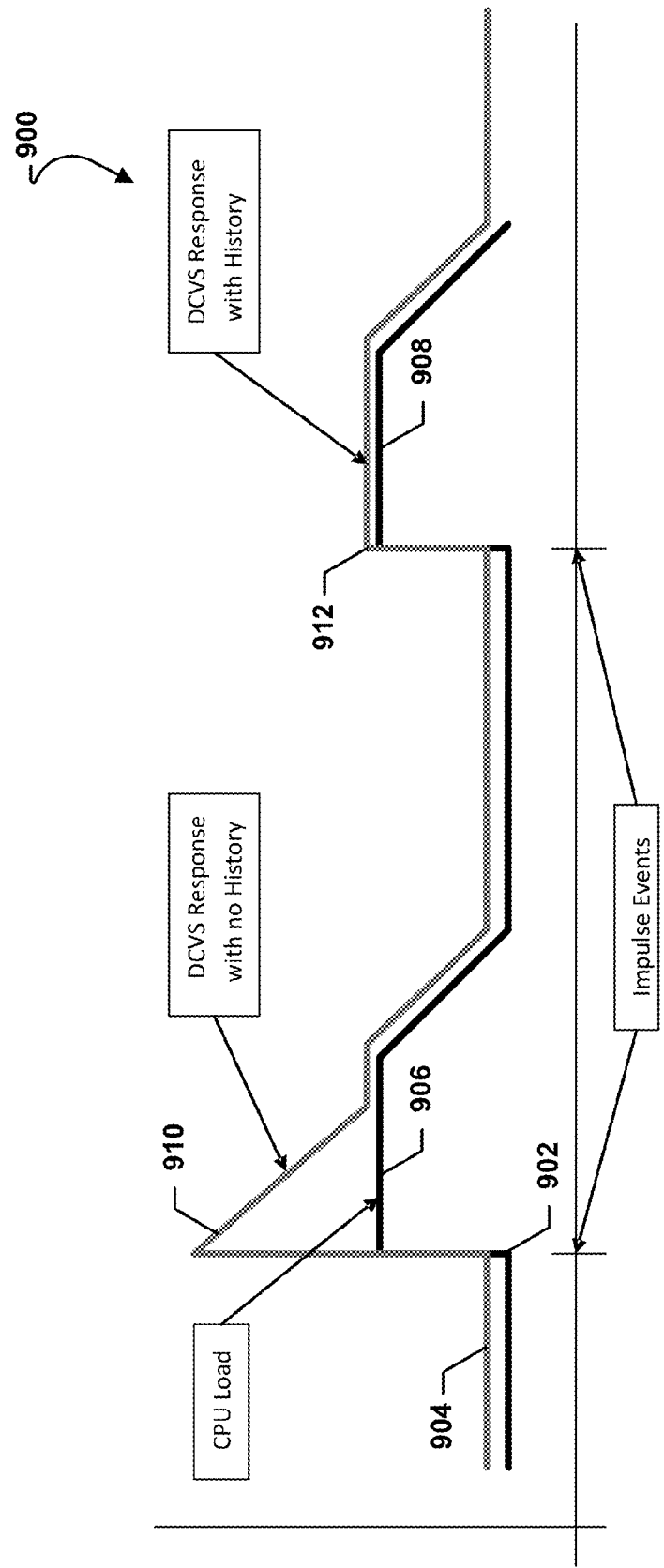
FIG. 9 is a third graph illustrating a workload and a dynamic clock and voltage scaling tracked load for a central processing unit plotted versus time.

FIG. 9 illustrates a third graph, generally designated 900, of a workload and a DCVS response for a central processing unit plotted versus time. As shown, the graph 900 may include a workload indicator 902 and a DCVS response indicator 904. As shown, the workload indicator 902 may include a first busy cycle 906 and a second busy cycle 908. Each busy cycle 906, 908 may begin with an impulse event.

The DCVS response indicator 904 may include a first DCVS response 910 and a second DCVS response 912. The first DCVS response 910 is a response without using historical information associated with the workload. As shown, the first DCVS response 910 jumps to a maximum CPU frequency. Thereafter, the first DCVS response 910 may decrease as the DCVS algorithm is executed.

The second DCVS response 912 is a response that utilizes historical information associated with the workload. As shown, the second DCVS response 912 jumps to CPU frequency that meets or slightly exceeds the need previously associated with the workload. Thereafter, the second DCVS response 912 may decrease as the DCVS algorithm is executed. Removing high responsivity events from the DCVS problem space, as shown, allows for lower power during low responsivity operations, while providing better performance for high responsivity operations and enabling power savings for those same operations.

In a particular aspect, impulse density may be used as a workload indicator. For example, having impulses close together may inhibit the DCVS response since the DCVS may ignore impulses from a single source that occur sufficiently close together. Alternatively, having dense impulse train may imply a greater workload and may intensify the DCVS. In a particular aspect, close may be workload specific.

Figure 10:
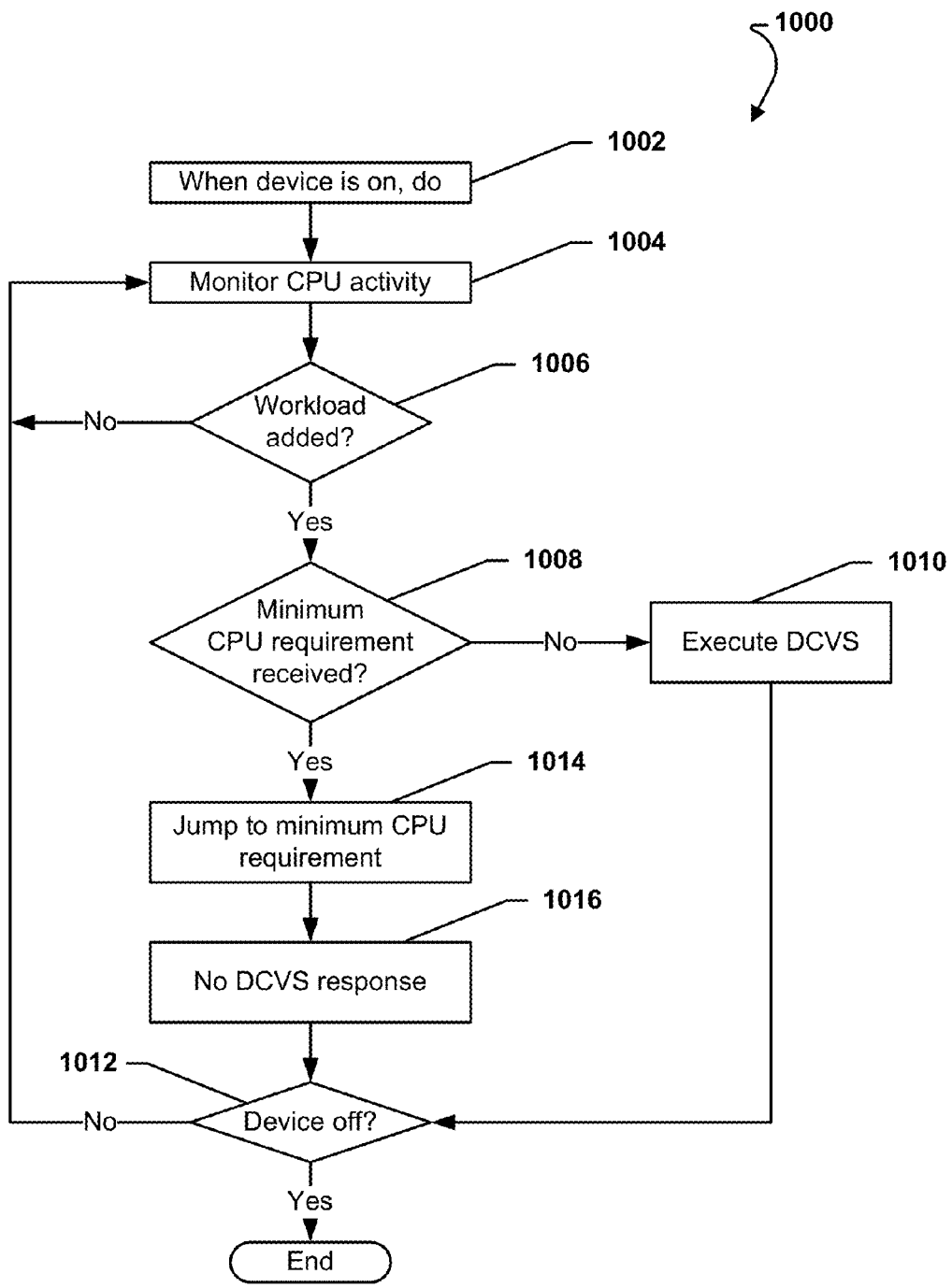
FIG. 10 is a flowchart illustrating a third aspect of a method of executing a dynamic clock and voltage switching algorithm within a central processing unit.

Referring to FIG. 10, a third aspect of a method of executing a dynamic clock and voltage scaling (DCVS) algorithm is shown and is generally designated 1000. The method 1000 begins at block 1002 with a do loop in which when a device is powered on, the following steps may be performed. At block 1004, a controller may monitor CPU activity. This activity may be the activity of a single core CPU, a multi-core CPU, multiple single core CPUs, multiple multi-core CPUs, or a combination thereof. Further, the controller may be a software controller, a hardware controller, or a combination thereof.

At decision 1006, the controller may determine if a workload is added. The workload may be a video application, an audio application, an email application, a wireless network application, a cellular network application, a short message service (SMS) application, a communication application, a security application, a calendar application, an instant messaging application, a still camera application, a global positioning system (GPS) application, a browser application, a memo pad application, a clock application, a game application, a calculator application, a banking application, a password keeper application, a help application, an ecommerce application, a software delivery application, a search application, an options application, a setup application, a telephone application, a connection management application, a security application, any other application, or a combination thereof.

In a particular aspect, if a workload is not added at decision 1006, the method 1000 may return to block 1004 and the method 1000 may continue as described herein. Otherwise, at decision 1006, if a workload is added, the method 1000 may continue to decision 1008, and the controller may determine whether a minimum CPU requirement for the workload is received, i.e., whether the workload is a registered workload with a particular requirement. If a minimum CPU requirement is not received, the method 1000 may proceed to block 1010 and the controller may execute, or cause to execute, a standard DCVS algorithm. Thereafter, the method 1000 may move to decision 1012. At decision 1012, the controller may determine whether the device is powered off. If the device is not powered off, the method 1000 may return to block 1004 and the method 1000 may continue as described herein.

Returning to 1008, if a minimum CPU requirement is received from the workload, the method 1000 may continue to block 1014. At block 1014, the controller may jump to the minimum CPU requirement received from the workload. Next, at block 1016, the controller may cause the DCVS to not execute for the workload. In other words, the controller may exempt the added workload from execution of the DCVS algorithm for the workload. Then, the method 1000 may continue to decision 1012 and continue as described herein.

Figure 11:
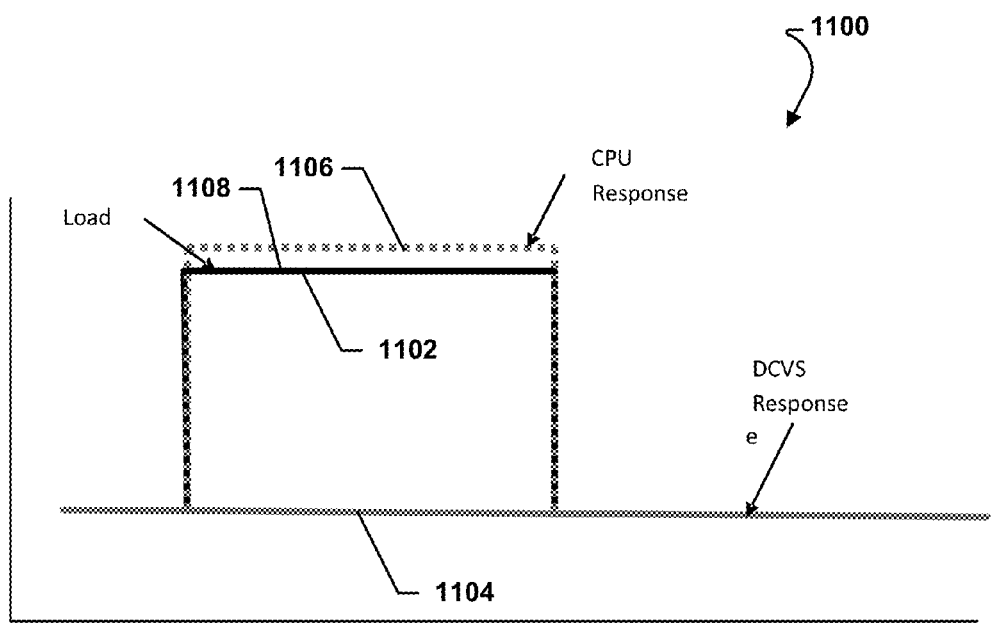
FIG. 11 is a fourth graph illustrating a workload and a dynamic clock and voltage scaling tracked load for a central processing unit plotted versus time.

FIG. 11 illustrates a fourth graph, generally designated 1100, of a workload, a DCVS response, and a CPU response for a central processing unit plotted versus time. As shown, the graph 1100 may include a workload indicator 1102, a DCVS response indicator 1104, and a CPU response indicator 1106. As shown, the workload indicator 1102 may include a busy cycle 1108. The CPU response indicator 1106 shows that the CPU may respond to a request for a minimum performance needs. The DCVS response indicator 1104 shows that the DCVS algorithm may ignore the workload.

For example, if a workload, task, or event, requests one hundred (100) MIPS of processing, and the DCVS algorithm simultaneously sees the CPU load increase by one hundred (100) MIPS, the DCVS algorithm may infer that there was no change in unrequested tasks. This may enable the DCVS algorithm to avoid false spikes in CPU usage. In such a case, the CPU response may track the workload on the performance critical leading region and the power critical trailing region without having the DCVS to respond to the workload.

Figure 12:
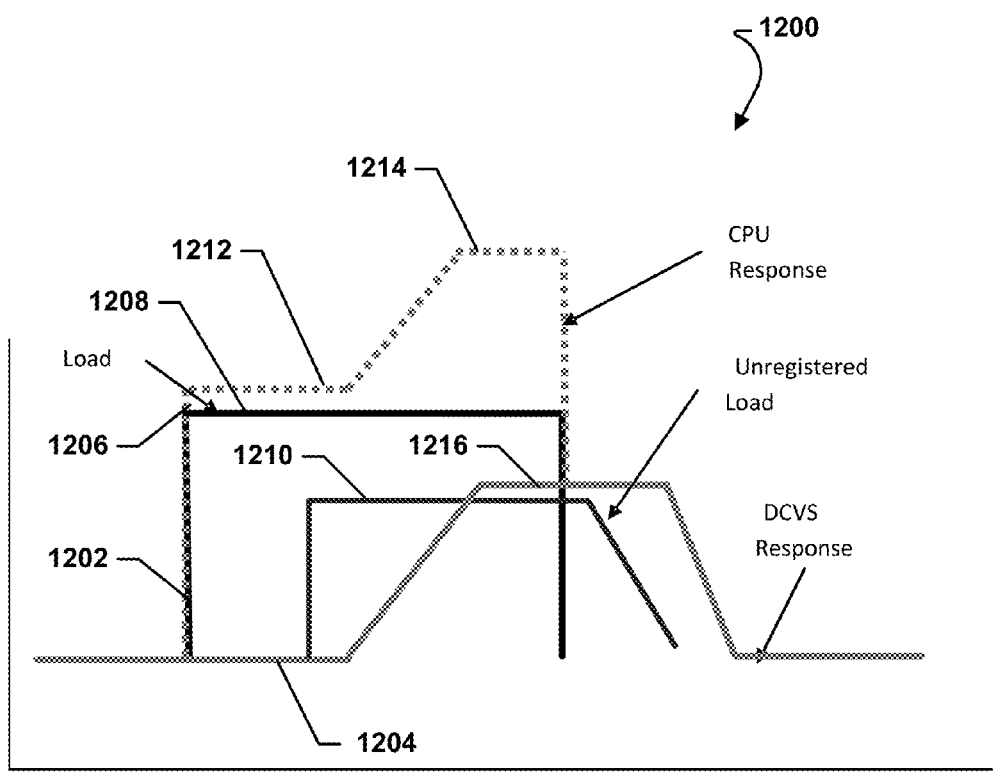
FIG. 12 is a fifth graph illustrating a workload and a dynamic clock and voltage scaling tracked load for a central processing unit plotted versus time.

FIG. 12 illustrates a fifth graph, generally designated 1200, of a workload, a DCVS response, and a CPU response for a central processing unit plotted versus time. As shown, the graph 1200 may include a workload indicator 1202, a DCVS response indicator 1204, and a CPU indicator 1206. As shown, the workload indicator 1202 may include a registered workload 1208 and an unregistered workload 1210. When the registered workload 1208 occurs the CPU indicator 1206 shows that the CPU may have a first CPU response 1212 while the DCVS indicator 1204 shows that the DCVS algorithm has no response. When the unregistered workload 1210 occurs, the CPU indicator 1206 shows a second CPU response 1214 and the DCVS indicator 1204 shows a DCVS response 1216. Since the DCVS algorithm may be informed of the requirements of the registered workload 1208, the DCVS algorithm may track the unregistered workload 1210 without responding to any changes induced by the registered workload 1208.

Figure 13:
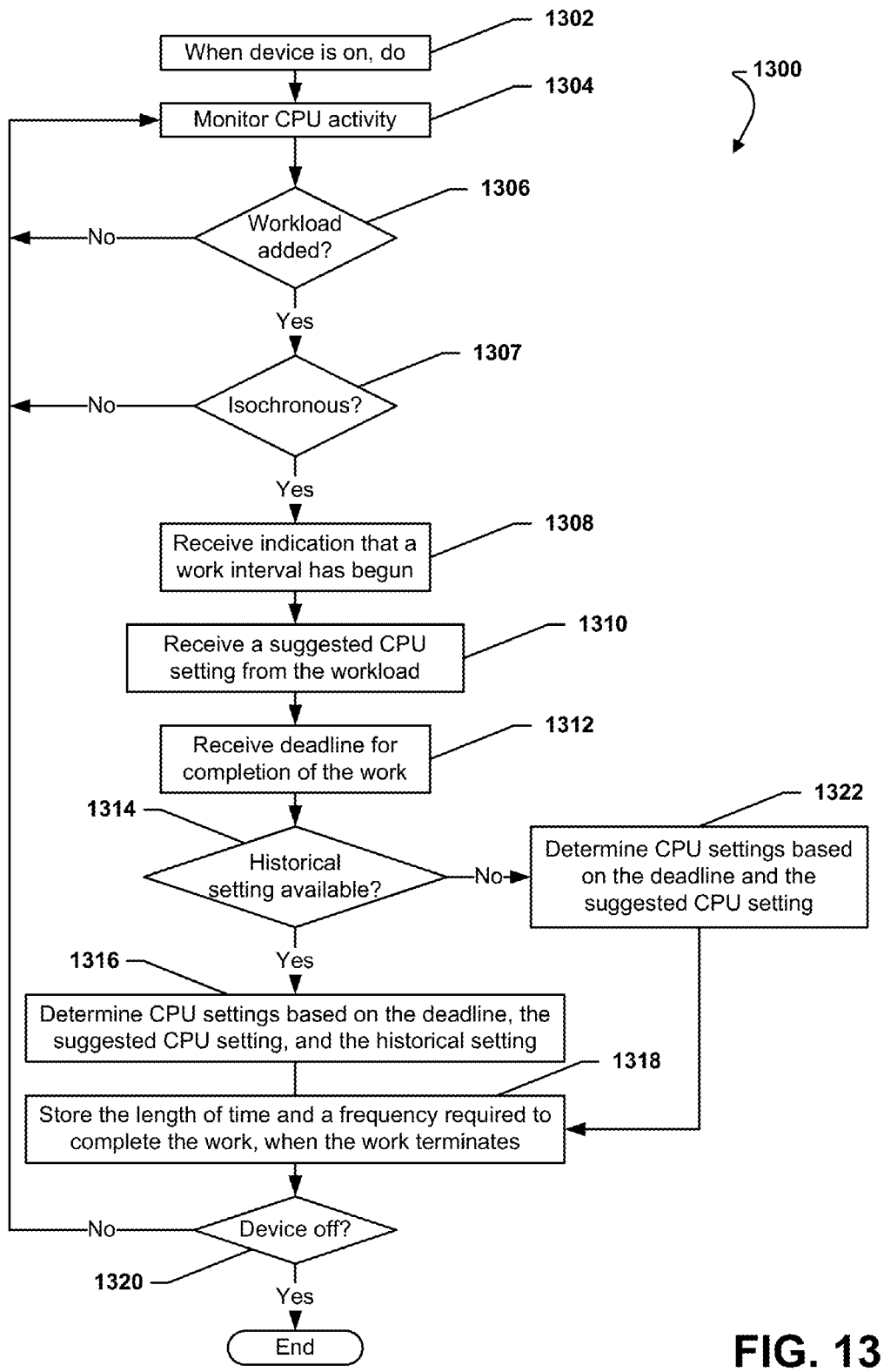
FIG. 13 is a flowchart illustrating a fourth aspect of a method of executing a dynamic clock and voltage switching algorithm within a central processing unit.

Referring to FIG. 13, a first aspect of a method of executing a dynamic clock and voltage scaling (DCVS) algorithm is shown and is generally designated 1300. The method 1300 begins at block 1302 with a do loop in which when a device is powered on, the following steps may be performed. At block 1304, a controller may monitor CPU activity. This activity may be the activity of a single core CPU, a multi-core CPU, multiple single core CPUs, multiple multi-core CPUs, or a combination thereof. Further, the controller may be a software controller, a hardware controller, or a combination thereof.

At decision 1306, the controller may determine if a workload is added. The workload may be a video application, an audio application, an email application, a wireless network application, a cellular network application, a short message service (SMS) application, a communication application, a security application, a calendar application, an instant messaging application, a still camera application, a global positioning system (GPS) application, a browser application, a memo pad application, a clock application, a game application, a calculator application, a banking application, a password keeper application, a help application, an ecommerce application, a software delivery application, a search application, an options application, a setup application, a telephone application, a connection management application, a security application, any other application, or a combination thereof.

In a particular aspect, if a workload is not added at decision 1306, the method 1300 may return to block 1304 and the method 1300 may continue as described herein. Otherwise, at decision 1306, if a workload is added, the method 1300 may continue to decision 1307 and the controller may determine whether the workload is an isochronous workload. An isochronous workload may be a workload that occurs at a substantially regular duration. Alternatively, an isochronous workload may be workload that occurs at a substantially regular interval at a substantially regular duration.

If the workload is not isochronous, the method 1300 may return to block 1304 and the method 1300 may continue as described herein. If the workload is isochronous, the method 1300 may proceed to block 1308. At block 1308, the controller may receive indication that a work interval has begun. Further, at block 1310, the controller may receive a suggested CPU setting from the workload. Next, at block 1312, the controller may receive a deadline for completion of the work.

Moving to decision 1314, the controller may determine whether a historical setting is available for the workload. If so, the method 1300 may proceed to block 1316 and the controller may determine CPU settings, e.g., a frequency, a voltage, etc., based on the deadline, the suggested CPU setting, and the historical setting. Next, at block 1318, the controller store a length of time and a frequency required to complete the work, when the work terminates. This may allow the controller to adapt to the workload and use the information on subsequent workload requests. In other words, this allows for adaptive learning by the controller.

Then, the method 1300 may move to decision 1320 and the controller may determine whether the device is powered off. If the device is not powered off, the method 1300 may return to block 1304 and the method 1300 may continue as described herein. Otherwise, if the device is powered off, the method 1300 may end.

Returning to decision 1314, if the controller does not have a historical setting for the workload, the method 1300 may proceed to block 1322 and the controller may determine one or more CPU settings based on the deadline and the suggested CPU setting. Thereafter, the method 1300 may proceed to block 1318 and the method 1300 may continue as described herein.

If the work in a particular use case is largely repeatable from interval to interval, it is possible to use data from previous work intervals to predict the amount of work that will be necessary in the next interval. In order to inform the dynamic resource manager, e.g., the controller, of its requirements, the use case indicates that a work interval has begun along with the deadline when the work needs to be completed. When the work is actually completed, the use case indicates that the work has finished.

With knowledge of how long the work had to complete versus how long the work actually took to complete, it is possible to find alternate resource settings that would be more power optimal yet still complete processing before the deadline. On subsequent requests, the resource receives the same information, but can use past history in order to determine more power optimal resource settings yet still complete the work before the deadline.

There is a series of statistics that the resource manager may keep for each use case. These statistics include the mean work per interval and the variance in work from interval to interval. These statistics may be determined adaptively from the requests, seeded via benchmarks, or fixed as constants. There are also some statistics that may be kept about the resource, which include the amount of work performed per resource setting and the variability of that work, possibly per resource setting.

Figure 14:
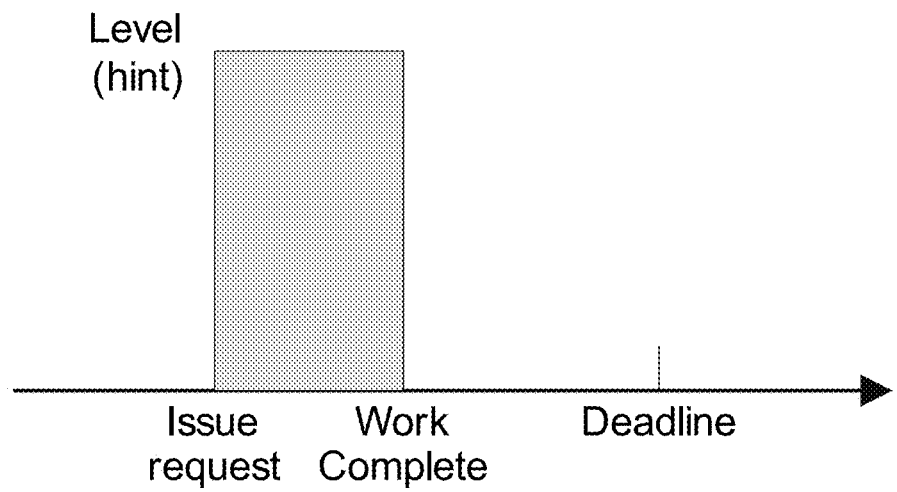
FIG. 14 is a sixth graph illustrating a workload and a dynamic clock and voltage scaling tracked load for a central processing unit plotted versus time.
Figure 15:
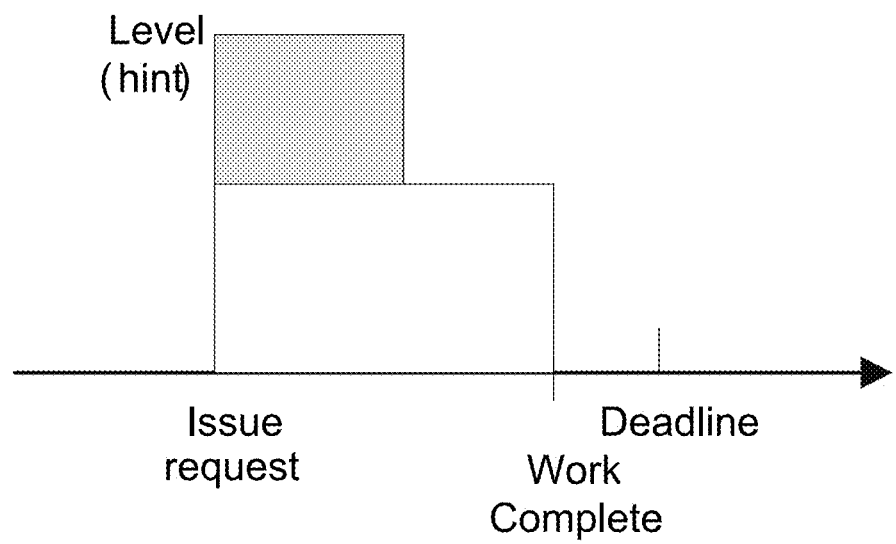
FIG. 15 is a seventh graph illustrating a workload and a dynamic clock and voltage scaling tracked load for a central processing unit plotted versus time.

To correctly function, future requests may have similar work requirements to previous ones. There are occasions when this is known to be false (say the video being decoded changes from 480i to 1080p—each frame now has a radically different amount of work). A mechanism may be provided to allow the use case to indicate that new requests constitute a new application and any previously learned statistics should be discarded. It is permissible for the use case to provide a hint to the resource manager, as shown in FIG. 14 and FIG. 15. This hint is a level that the work processing feels is sufficient to meet its need. The hint may be ignored by the dynamic resource manager.

It is permissible for the use case to provide a headroom requirement to the resource manager. This headroom specification is the amount of processing margin the resource must maintain when adjusting the resource setting. The headroom may alternatively be derived via work load variance.

With the indicators, it is possible for the target to optimize for power consumption independently of the use case—that is the use case implementation remains the same independent of the power optimization algorithm, even potentially independent of the target. A trivial initial implementation may include executing the resource at maximum, guaranteeing performance. Later, via offline optimization or adaptively determined statistics, the resource settings may be changed to a more power-optimal setting without having to modify the use case implementation.

In each of the methods described herein, rather than attempt to make the dynamic resource manager, i.e., the controller, be completely general purpose, the dynamic resource manager may be informed directly about the task requirements. This may allow the dynamic resource manager to make better resource management decisions. Use cases, or workloads, that benefit from informing the dynamic resource manager of their performance requirement may be identified and the requirements may be formalized. Further, an interface to the dynamic resource manager may be extended to integrate the information from the workloads.

The interface to the dynamically managed resources may include support for a series of common work models, e.g., required, isochronous, impulse, etc. All common work models may be placed in a library and may or may not be supported by any particular resource at the resource author's discretion. In addition, this may allow a resource author to define their own, potentially custom, work models and allow clients to issue these requests as well. These custom work models may be used to inform a resource of active client needs and minimize the required generality of the DCVS algorithm and increase optimization opportunities.

In a particular aspect, additional work models may include pulsed workloads, i.e., workloads that begin at a certain level and automatically cease at given time interval. Further, the work models may include best effort workloads that may include a hint that there is work that could be performed, but is not performance critical, it can be arbitrarily deferred. Also, the work models may include scheduled workloads that may include a notification that some amount of work will be required at a defined point in the future.

The methods described herein may allow the DCVS algorithm problem space to be arbitrarily reduced, and particular use case to be arbitrarily optimized, without impact to other use cases or other resources.

The methods described herein may further include additional inputs to the DCVS algorithm. For example, these additional inputs may include an idle distribution signal, an interrupt firing signal, and a timer firing signal. Further, the distribution of interrupts and timers may be used as additional inputs into the DCVS algorithm. By including these inputs, the DCVS algorithm may function more effectively and efficiently by having more enhanced system knowledge.

These inputs can be used to detect modes, such as audio playback, and adjust the DCVS algorithm to yield a more optimal solution for the detected case. The inputs may also be used to detect changes in modes, such as a phone call coming in, a user event, or even just the detection of non-volatile (NV) memory access to buffer audio content. Further, these inputs may enable tuning of the DCVS algorithm with substantially minimal client interaction.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof. Further, the method steps described herein may be executed on a single core processor, a multicore processor, multiple single core processors, multiple multicore processors, or any combination thereof. Also, the methods herein may be used to dynamically control various types of processors. For example, the methods herein may be used to control a central processing unit (CPU), a graphics processing units (GPU), etc.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of performing dynamic clock and voltage scaling (DCVS) operations on a mobile telephone computing device, the method comprising:
    associating a DCVS algorithm with a processor of the mobile telephone computing device;
    detecting a new workload in the processor;
    determining in the processor whether the new workload is an impulse workload corresponding to an event having a known starting point at a beginning of a busy cycle, an unknown end, and an unknown load;
    executing the DCVS algorithm in the processor when it is determined that the new workload is not an impulse workload;
    determining in the processor whether the new workload includes at least one of a predetermined solution and frequency requirements when it is determined that the new workload is an impulse workload, wherein determining whether the new workload includes frequency requirements comprises determining whether an existing processor frequency level is associated with the new workload based on a result of querying a database;
    setting a current operating frequency of the processor to a maximum operating frequency when it is determined that the new workload does not include frequency requirements;
    setting the current operating frequency of the processor to an aggregate of the frequency requirements included in the new workload and preexisting frequency requirements when it is determined that the new workload includes frequency requirements; and
    executing the DCVS algorithm in the processor from the current operating frequency, wherein the response of the DCVS algorithm varies for different impulse workloads.

2. The method of claim 1, wherein executing the DCVS algorithm in the processor from the current operating frequency comprises:
    executing the DCVS algorithm in the processor from the maximum operating frequency and reducing the operating frequency of the processor in discrete steps.

3. The method of claim 1, wherein determining in the processor whether the new workload includes frequency requirements when it is determined that the new workload is an impulse workload comprises determining in the processor whether a memory of the mobile telephone computing device stores historical values generated from previous executions of other impulse workloads.

4. The method of claim 1, further comprising:
    assigning a unique identifier to the new workload in response to determining that the new workload is an impulse workload; and
    querying the database to determine whether the database includes a record associated with the assigned unique identifier,
    wherein determining whether the new workload includes frequency requirements comprises determining whether an existing processor frequency level is associated with the new workload based on a result of querying the database in response to determining that the database includes a record associated with the unique identifier.

5. A mobile telephone computing device, comprising:
    means for associating a dynamic clock and voltage scaling (DCYS) algorithm with a processor of the mobile telephone computing device;
    means for detecting a new workload in the processor;
    means for determining whether the new workload is an impulse workload corresponding to an event having a known starting point at a beginning of a busy cycle, an unknown end, and an unknown load;
    means for executing the DCYS algorithm when it is determined that the new workload is not an impulse workload;
    means for determining whether the new workload includes at least one of a predetermined solution and frequency requirements when it is determined that the new workload is an impulse workload, wherein the means for determining whether the new workload includes frequency requirements comprises means for determining whether an existing processor frequency level is associated with the new workload based on a result of querying a database;
    means for setting a current operating frequency of the processor to a maximum operating frequency when it is determined that the new workload does not include frequency requirements;
    means for setting the current operating frequency of the processor to an aggregate of the frequency requirements included in the new workload and preexisting frequency requirements when it is determined that the new workload includes frequency requirements; and means for executing the DCVS algorithm from the current operating frequency, wherein the response of the DCVS algorithm varies for different impulse workloads.

6. The mobile telephone computing device of claim 5, wherein means for executing the DCVS algorithm from the current operating frequency comprises:
    means for executing the DCVS algorithm from the maximum operating frequency and reducing the operating frequency in discrete steps.

7. The mobile telephone computing device of claim 5, wherein means for determining whether the new workload includes frequency requirements when it is determined that the new workload is an impulse workload comprises means for determining whether a memory of the mobile telephone computing device stores historical values generated from previous executions of other impulse workloads.

8. The mobile telephone computing device of claim 5, further comprising:
    means for assigning a unique identifier to the new workload in response to determining that the new workload is an impulse workload; and
    means for querying the database to determine whether the database includes a record associated with the assigned unique identifier,
    wherein means for determining whether the new workload includes frequency requirements comprises means for determining whether an existing processor frequency level is associated with the new workload based on a result of querying the database in response to determining that the database includes a record associated with the unique identifier.

9. A mobile telephone computing device, comprising:
    a processor configured with processor-executable instructions to perform operations comprising:
        associating a dynamic clock and voltage scaling (DCVS) algorithm with the processor;
        detecting a new workload in the processor;
        determining whether the new workload is an impulse workload corresponding to an event having a known starting point at a beginning of a busy cycle, an unknown end, and an unknown load;
        executing the DCVS algorithm when it is determined that the new workload is not an impulse workload;
        determining whether the new workload includes at least one of a predetermined solution and frequency requirements when it is determined that the new workload is an impulse workload, wherein determining whether the new workload includes frequency requirements comprises determining whether an existing processor frequency level is associated with the new workload based on a result of querying a database;
        setting a current operating frequency of the processor to a maximum operating frequency when it is determined that the new workload does not include frequency requirements;
        setting the current operating frequency of the processor to an aggregate of the frequency requirements included in the new workload and preexisting frequency requirements when it is determined that the new workload includes frequency requirements; and
        executing the DCVS algorithm from the current operating frequency, wherein the response of the DCVS algorithm varies for different impulse workloads.

10. The mobile telephone computing device of claim 9, wherein the processor is configured with processor-executable instructions to perform operations such that executing the DCVS algorithm from the current operating frequency comprises:
    executing the DCVS algorithm from the maximum operating frequency and reducing the operating frequency in discrete steps.

11. The mobile telephone computing device of claim 9, wherein the processor is configured with processor-executable instructions to perform operations such that determining whether the new workload includes frequency requirements when it is determined that the new workload is an impulse workload comprises determining whether a memory of the mobile telephone computing device stores historical values generated from previous executions of other impulse workloads.

12. The mobile telephone computing device of claim 9, wherein the processor is configured with processor-executable instructions to perform operations further comprising:
    assigning a unique identifier to the new workload in response to determining that the new workload is an impulse workload; and
    querying the database to determine whether the database includes a record associated with the assigned unique identifier, and
    wherein the processor is configured with processor-executable instructions to perform operations such that determining whether the new workload includes frequency requirements comprises determining whether an existing processor frequency level is associated with the new workload based on a result of querying the database in response to determining that the database includes a record associated with the unique identifier.

13. A non-transitory computer readable storage medium having stored thereon processor-executable software instructions configured to cause a processor on a mobile telephone computing device to perform operations comprises:
    associating a dynamic clock and voltage scaling (DCYS) algorithm with the processor;
    detecting a new workload in the processor;
    determining whether the new workload is an impulse workload corresponding to an event having a known starting point at a beginning of a busy cycle, an unknown end, and an unknown load;
    executing the DCYS algorithm when it is determined that the new workload is not an impulse workload;
    determining whether the new workload includes at least one of a predetermined solution and frequency requirements when it is determined that the new workload is an impulse workload, wherein determining whether the new workload includes frequency requirements comprises determining whether an existing processor frequency level is associated with the new workload based on a result of querying a database;
    setting a current operating frequency of the processor to a maximum operating frequency when it is determined that the new workload does not include frequency requirements;
    setting the current operating frequency of the processor to an aggregate of the frequency requirements included in the new workload and preexisting frequency requirements when it is determined that the new workload includes frequency requirements; and
    executing the DCVS algorithm from the current operating frequency, wherein the response of the DCVS algorithm varies for different impulse workloads.

14. The non-transitory computer readable storage medium of claim 13, wherein the stored processor-executable software instructions are configured to cause a processor to perform operations such that executing the DCVS algorithm from the current operating frequency comprises:
    executing the DCVS algorithm from the maximum operating frequency and reducing the current operating frequency in discrete steps.

15. The non-transitory computer readable storage medium of claim 13, wherein the stored processor-executable software instructions are configured to cause a processor to perform operations such that determining whether the new workload includes frequency requirements when it is determined that the new workload is an impulse workload comprises determining whether a memory of the mobile telephone computing device stores historical values generated from previous executions of other impulse workloads.

16. The non-transitory computer readable storage medium of claim 13, wherein the stored processor-executable software instructions are configured to cause a processor to perform operations further comprising:
    assigning a unique identifier to the new workload in response to determining that the new workload is an impulse workload; and
    querying the database to determine whether the database includes a record associated with the assigned unique identifier, and
    wherein the stored processor-executable software instructions are configured to cause a processor to perform operations such that determining whether the new workload includes frequency requirements comprises determining whether an existing processor frequency level is associated with the new workload based on a result of querying the database in response to determining that the database includes a record associated with the unique identifier.

* * * * *